(12) United States Patent
Greene et al.

(10) Patent No.: US 10,300,838 B2
(45) Date of Patent: May 28, 2019

(54) MICRO-ADJUSTMENT DEVICE FOR LIGHTING MODULES

(71) Applicant: VALEO NORTH AMERICA, INC., Troy, MI (US)

(72) Inventors: Kayla Greene, Seymour, IN (US);
Gavin Warner, Seymour, IN (US);
Mark Madden, Seymour, IN (US);
Mark Singleton, Seymour, IN (US);
Brad Baker, Seymour, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 197 days.

(21) Appl. No.: 15/214,112

(22) Filed: Jul. 19, 2016

(65) Prior Publication Data

US 2018/0022264 A1  Jan. 25, 2018

(51) Int. Cl.
| | |
|---|---|
| *B60Q 1/068* | (2006.01) |
| *F21S 45/47* | (2018.01) |
| *F16B 5/02* | (2006.01) |
| *F21V 17/02* | (2006.01) |
| *F16B 39/282* | (2006.01) |
| *B63B 45/02* | (2006.01) |
| *B63B 45/04* | (2006.01) |
| *B64D 47/02* | (2006.01) |
| *F16B 25/00* | (2006.01) |
| *F16B 33/00* | (2006.01) |
| *F16B 35/04* | (2006.01) |

(52) U.S. Cl.
CPC .......... *B60Q 1/0683* (2013.01); *F16B 5/0233* (2013.01); *F16B 5/0266* (2013.01); *F16B 5/0275* (2013.01); *F21S 45/47* (2018.01); *B60Q 2200/32* (2013.01); *B63B 45/02* (2013.01); *B63B 45/04* (2013.01); *B64D 47/02* (2013.01); *B64D 2203/00* (2013.01); *F16B 25/0015* (2013.01); *F16B 25/0021* (2013.01); *F16B 33/008* (2013.01); *F16B 35/047* (2013.01); *F16B 39/282* (2013.01); *F21V 17/02* (2013.01)

(58) Field of Classification Search
USPC .................................... 362/249.04
See application file for complete search history.

(56) References Cited

U.S. PATENT DOCUMENTS

| | | | |
|---|---|---|---|
| 5,065,293 A | 11/1991 | Mochizuki | |
| 5,573,326 A * | 11/1996 | Iijima | B60Q 1/0683 362/273 |
| 5,669,695 A | 9/1997 | Parker et al. | |

(Continued)

FOREIGN PATENT DOCUMENTS

GB  167465  7/1921

*Primary Examiner* — Michael G Lee
*Assistant Examiner* — David Tardif
(74) *Attorney, Agent, or Firm* — Oblon, McClelland, Maier & Neustadt, L.L.P.

(57) ABSTRACT

A device for micro-adjustment of a lighting module has a first end including a thread to be driven into a surface of the lighting module. A second end of the device includes a micro-adjustment thread for attachment of a nut. A flange is positioned between the thread of the first end and the micro-adjustment adjustment thread of the second end. The device also includes a driving feature positioned between the flange and the micro-adjustment adjustment thread. The driving feature has an outer diameter that is smaller than an outer diameter of the flange.

20 Claims, 5 Drawing Sheets

(56) References Cited

U.S. PATENT DOCUMENTS

| | | | | |
|---|---|---|---|---|
| 5,779,343 A | * | 7/1998 | Denley | B60Q 1/0683 362/273 |
| 2003/0223242 A1 | | 12/2003 | Deguchi | |
| 2006/0291231 A1 | | 12/2006 | Deguchi | |

* cited by examiner

MICRO-ADJUSTMENT DEVICE FOR LIGHTING MODULES

BACKGROUND

Field of the Invention

This invention relates to an adjustable lighting apparatus, and more particularly to a device that allows for micro adjustment of a lighting module of the apparatus Description of the Related Art Lights for vehicles, such as headlights for an automobile, are typically designed to be aimed in a predetermined direction. To ensure that a headlight is aimed in the predetermined direction once the headlight is installed in the vehicle, the headlight may include an adjustment device.

Known adjustment devices for headlights are described in U.S. Pat. Nos. 5,065,293 and 5,669,695. Such adjustment devices often include a screw that, when turned, adjusts the aim of the headlight vertically or horizontally. Screws for adjusting headlights are described in U.S. Pat. Nos. 6,918,687 and 7,572,042.

Lighting for vehicles is evolving. Headlights can include more than one source of light within a single headlight. New adjustment devices are required to provide precise adjustment for such headlights.

SUMMARY

It is an objective of the invention to provide an adjustment device that provides precise adjustment for headlights or other lighting devices.

It is another objective of the invention to provide an adjustment device with fewer components than a traditional device.

These and/or other objectives may be provided by embodiments of the invention disclosed herein. In one embodiment, a device for micro-adjustment of a lighting module is provided that has a first end including a thread to be driven into a surface of the lighting module. A second end of the device includes a micro-adjustment thread for attachment of a nut. A flange is positioned between the thread of the first end and the micro-adjustment adjustment thread of the second end. The device also includes a driving feature positioned between the flange and the micro-adjustment adjustment thread. The driving feature has an outer diameter that is smaller than an outer diameter of the flange.

In another embodiment, the device is included in a lighting apparatus that also includes a lighting module to output light from the lighting apparatus, a biasing element, including a first end in contact with the flange and a second end in contact with a first side of the housing, to bias the flange away from the housing, and a fastener on the micro-adjustment adjustment thread and in contact with a second side of the housing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
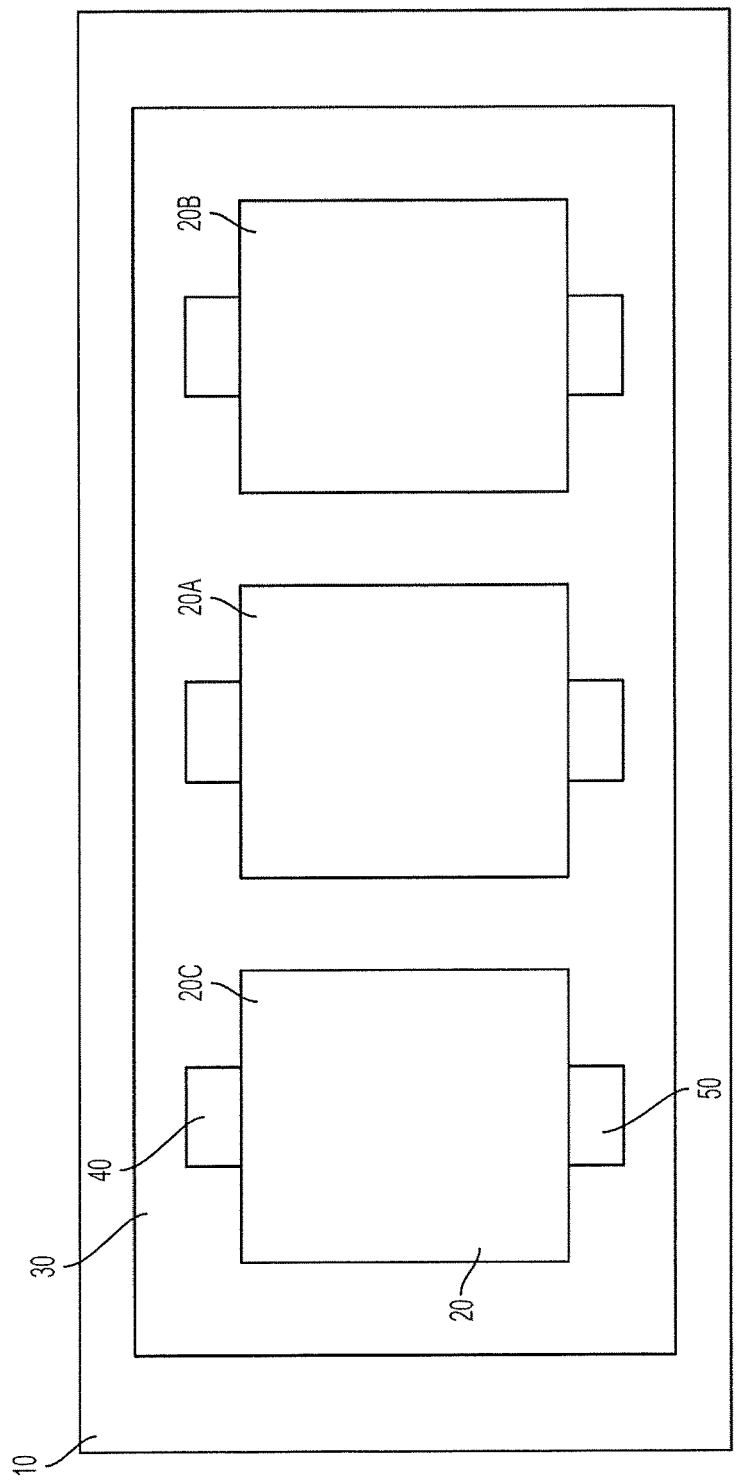
FIG. 1 shows an exemplary lighting apparatus.

Referring now to the drawings, wherein like reference numerals designate identical or corresponding parts throughout the several views.

FIG. 1 shows an exemplary lighting apparatus 10. The lighting apparatus 10 can be a headlight, fog light, taillight, or other light for a vehicle, such as a car, truck, SUV, van, motorcycle, boat, or plane. The lighting apparatus 10 can also be used in a non-vehicle lighting application or in a non-lighting application in which the module is replaced with an element requiring position adjustment. The lighting apparatus 10 can be used to control angle, location, and/or tilt in all axes for the element.

The lighting apparatus 10 includes one or more light sources, such as lighting module 20, that emit light from the lighting apparatus 10. Each lighting module 20 can include a light emitting diode (LED) or other light-emitting element to produce light, such as halogen, xenon, organic LED (OLED), laser diode, fiber LED, etc. In the exemplary embodiment shown in FIG. 1, three of the lighting modules 20 are provided. In alternative embodiments, a different number of lighting modules 20 (one, two, four, five, or more than five) is provided. Each lighting module can include the light-emitting element, a cooling device (for example, a heat sink), reflectors, lenses, circuitry, and other hardware associated with the light-emitting element.

Each of the lighting modules 20 is attached to a housing, such as a bracket 30, of the lighting apparatus 10. In one embodiment, all of the lighting modules 20 are attached to the same bracket 30. In alternative embodiments, two or more brackets 30 can be provided and one or more lighting modules 20 can be attached to each bracket 30. The bracket 30 can be made of metal, such as aluminum, or plastic. The bracket 30 can be part of the housing that forms an exterior of the light apparatus 10 or it can be a separate piece attached, directly or indirectly, to the housing.

When multiple lighting modules 20 are provided in a single lighting apparatus 10, the lighting modules 20 need to be adjustable with respect to one another to ensure correct aiming of the light emitted from the lighting apparatus 10. In the exemplary embodiment shown in FIG. 1, the lighting module 20A positioned at the center of the lighting apparatus 10 is fixed to the bracket 30 of the lighting apparatus 10. The lighting module 20A can be fixed to the bracket using hardware, such as a press-fit screw. Accordingly, the center lighting module 20A is not adjustable with respect to the bracket 30 once it is fixed to the bracket 30.

The lighting module 20B positioned on the right side of the lighting apparatus 10 and the lighting module 20C positioned on the left side of the lighting apparatus 10 are adjustably attached to the bracket 30, as discussed below. Accordingly, the right and left lighting modules 20B, 20C can each be adjusted with respect to the bracket 30 that they are attached to, and thus are also adjustable with respect to each other and the center lighting module 20A. Although the center lighting module is fixed and the side lighting modules are adjustable in the embodiment described above, in alternative embodiments, either of the side lighting modules can be the fixed module and the other lighting modules can be adjustable. In another exemplary embodiment, all of the lighting modules in the lighting apparatus can be adjustably attached to the bracket.

The right and left lighting modules 20B, 20C are each attached to the bracket 30 in the same manner in the exemplary embodiment shown in FIG. 1. Accordingly, the attachment described below with respect to right lighting module 20B can also be used for the left lighting module 20C as well. Alternatively, if micro adjustment is not required for one or more lighting modules, such modules can be attached in an adjustable manner in the same lighting apparatus that includes one or more lighting modules that are attached as discussed below.

The lighting module 20B is attached via a top attachment 40 and a bottom attachment 50 to the bracket 30. In the exemplary embodiment described herein, the top attachment 40 is adjustable and the bottom attachment 50 is not adjustable once the lighting module 20B is fixed to the bracket 30. However, in an alternative embodiment, the bottom attachment 50 can be adjustable and the top attachment 40 can be non-adjustable. Alternatively, both top and bottom attachments 40, 50 can be adjustable.

In alternative embodiments, more than two of the attachments are provided for each lighting module to provide greater adjustability. For example, a lighting module can include two top attachments and two bottom attachments. In another example, a light module can include attachments at the top, bottom, left, and right. In another example, a lighting module can include attachments on three corners for two-way adjustment. Each attachment can be adjustable or any one or more of the attachments can be non-adjustable.

Figure 2:
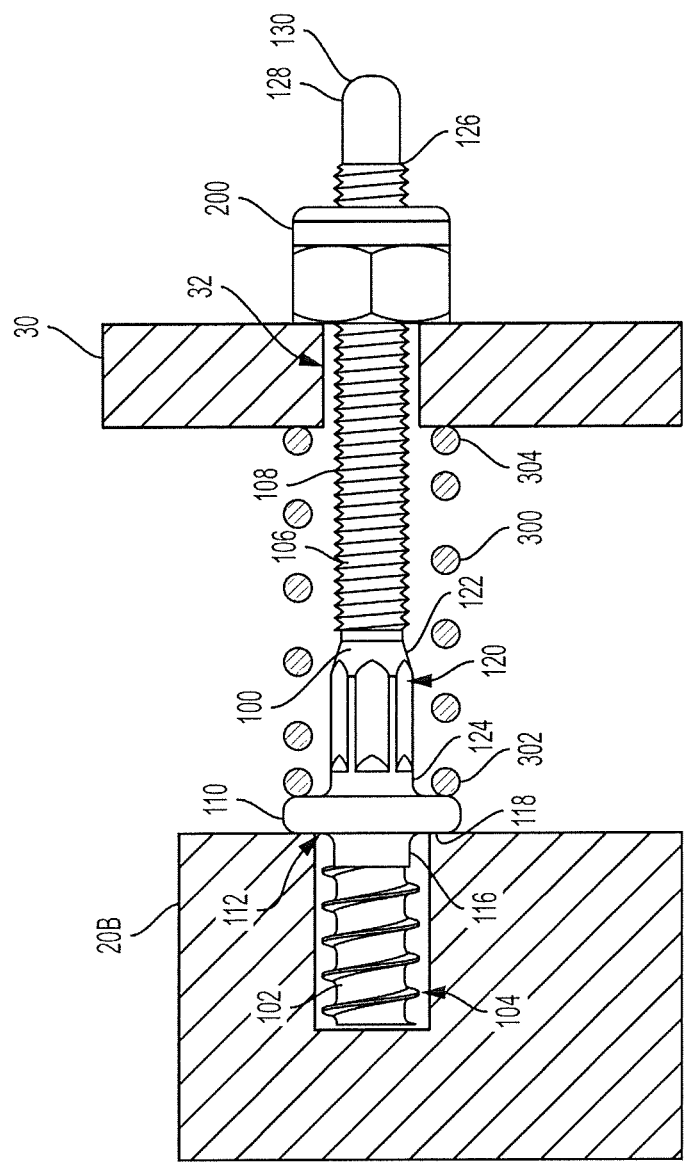
FIG. 2 shows an exemplary top attachment.

FIG. 2 shows an exemplary embodiment of the top attachment 40. Specifically, an attachment device 100 is used to adjustably attach the lighting module 20B to the bracket 30. The attachment device 100 is a double-sided stud that provides micro-adjustment of the lighting module 20B with respect to the bracket 30, and thus the other lighting modules 20A, 20C. As used herein, a "micro" adjustment is the smallest increment required to align the lighting modules to their intended optical positions and to one another. Micro-adjustment is required when multiple lighting modules are used to perform a single function and the mechanical tolerances of the optical systems are greater than the allowable tolerance of the optical output position. In an exemplary embodiment with the dimensions described herein, to achieve the optical output position, the micro-adjustment device is required to adjust a lighting module by 0.14 degrees per quarter turn (0.57 degrees per full rotation). Thus, the pitch of the thread on an attachment device that provides micro-adjustment is determined by the increment required and the height of the optical module using basic trigonometry.

Figure 3:
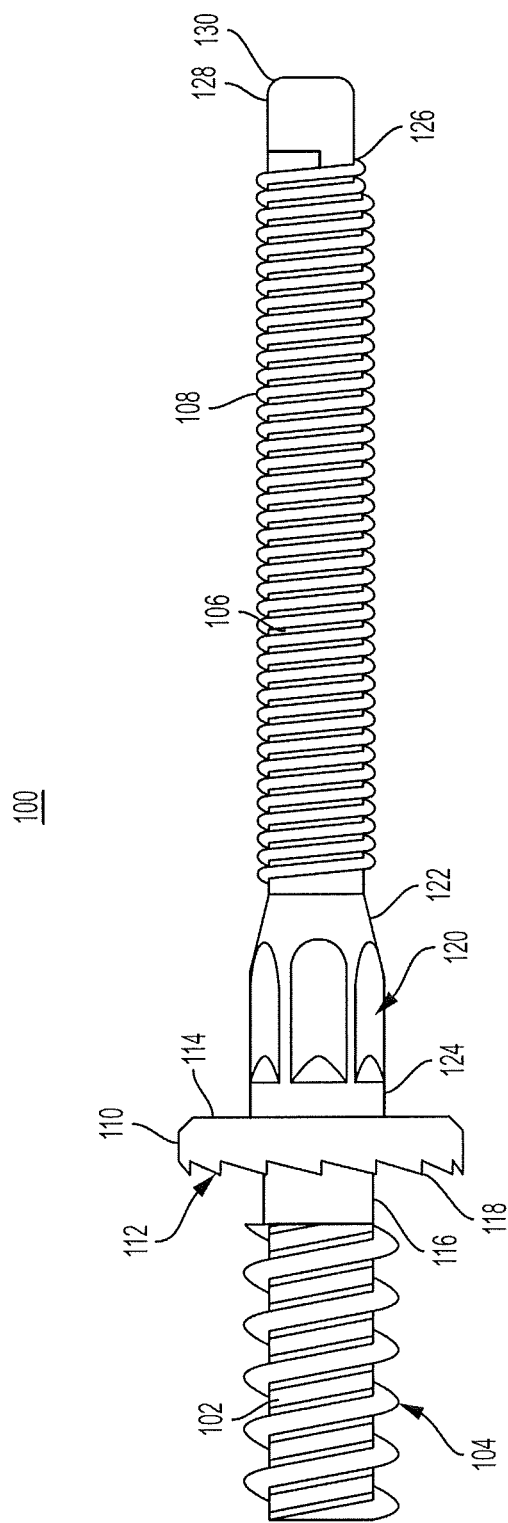
FIG. 3 shows a side view of an exemplary attachment device.
Figure 4:
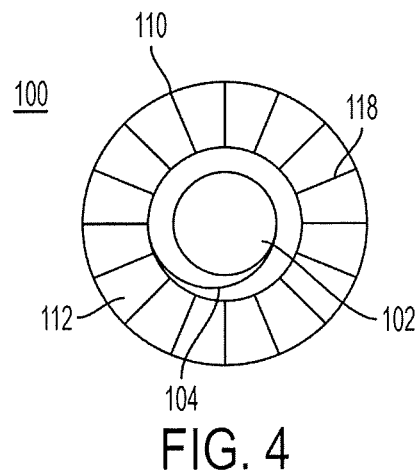
FIG. 4 shows an end view of an exemplary attachment device.
Figure 5:
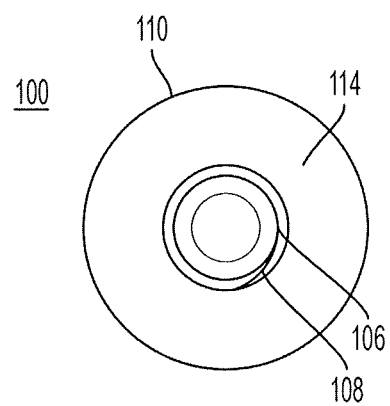
FIG. 5 shows another end view of an exemplary attachment device.

A side view of the attachment device 100 in isolation is shown in FIG. 3. The attachment device 100 includes a first end 102 including a first thread 104, a second end 106 including a second thread 108, and a flange 110 separating the first end 102 from the second end 106. FIGS. 4 and 5 show, respectively, the attachment device from the first end 102 and from the second end 106.

The first thread 104, which is on the first end 102 of the attachment device 100, is driven into the lighting module 20B. The thread 104 is selected according to the type of material it is to be driven into. For example, the thread 104 can be a metal thread or a plastic thread depending on whether the portion of the lighting module 20B that receives the first end 102 of the attachment device 100 is made of metal or plastic. Exemplary embodiments of such a thread 104 are the Delta PT® and ALtracs®, both available from ATF, Inc. of Lincolnwood, Ill. In an exemplary embodiment, the thread 104 has an external diameter of 4.0 mm and a pitch of 1.46.

The first thread 104 can extend over the entire first end 102 up to a first face 112 of the flange 110. Alternatively, the first end can include a threadless portion 116 between the first thread 104 and the flange 110. In an exemplary embodiment, the threadless portion 116 has a length of 0 to 1.47 mm.

The flange 110 is the portion of the attachment device with the greatest outer diameter. The outer diameter of the flange is larger than the outer diameter of the largest thread on the second end 106 and larger than an inner diameter of the fastener 200. In an exemplary embodiment, the outer diameter of the flange is from 7.9 to 8.65 mm. A larger diameter could be provided when space within the housing allows.

The flange 110 can include one or more locking serrations 118 on the first face 112. When the first end 102 of the attachment device 100 is driven into the lighting module 20B, the locking serrations 118 contact the lighting module 20B to help prevent the attachment device 100 from backing out of engagement with the lighting module 20B, and thus help ensure that the lighting module 20B maintains its precise aim.

In the exemplary embodiment shown in FIG. 4, the first face 112 includes sixteen of the locking serrations 118. The locking serrations 118 are evenly spaced around the first face 112 and extend out in a radial direction. In alternative embodiments, less than 16 or more than 16 of the serrations can be provided.

The second end 106 of the attachment device 100 extends out from the second face 114 (See FIG. 5) of the flange 110. The second end 106 includes a second thread 108. As explained further below, the second thread 108 provides for the micro adjustment of the adjustment device 100. Accordingly, the thread pitch of the second thread 108 is lower than the thread pitch of the first thread 104. To provide for sufficiently fine adjustment of the adjustment device 100, which will depend on the optical positions of the lighting modules and the height of the lighting modules as described above, the thread pitch of the second thread 108 is in a range from 0.1 mm to 4.0 mm. In an exemplary embodiment, the diameter of the second thread 108 is 3.0 mm.

The second end 106 of the attachment device 100 includes a driving feature 120 between the flange 110 and the start of the second thread 108. The driving feature 120 allows the attachment device 100 to be driven into the lighting module 20B. The location of the driving feature 120 being between the flange 110 and the second thread 108 allows the attachment device 100 to be driven from its center, thereby providing greater control and precision of attachment of the attachment device 100 to the lighting module 20B.

The driving feature 120 is shaped to receive a wrench or socket, such as a deep well torx or hex socket, to drive the attachment device 100 into the lighting module 20B. Thus, the driving feature 120 can have a cross-sectional shape of a torx (6-point start-shaped pattern) or hex (hexagonal pattern) such that the wrench or socket can contact the driving feature 120 to drive the attachment device 100 into the lighting module 20B. Other exemplary shapes include square, double square, spline drive, double hex, bristol, pentolobe, or other examples where a wrench or socket could be used to drive the driving feature 120.

In an exemplary embodiment, the driving feature 120 has a maximum outer diameter of 3.5 mm. The outer diameter of the driving feature 120 is smaller than that outer diameter of the flange 110. This allows the wrench or socket to abut the second face 114 of the flange 110 for more precision and control in driving the attachment device 100 into the lighting module 20B. A longer length of the driving feature 120 also provides improvements in precision and control in driving the attachment device 100. Thus, in an exemplary embodiment the length of the driving feature 120 is from 5.86 to 7.0 mm. Thus, the driving feature is 13.8% to 17.2% of the total length of the attachment device 100.

A minimum outer diameter of the driving feature 120 is equal to or greater than a maximum outer diameter of the second thread 108 to ensure contact of the socket with the driving feature 120. Thus, the second end 106 of the attachment device 100 includes an angled portion 122 to connect the second thread 108 to the driving feature 120. This angled portion 122 also helps guide the socket to the driving feature 120.

The driving feature 120 can extend to the second face 114 of the flange 110. Alternatively, the second end 106 of the attachment device 100 can include a threadless portion 124 between the driving feature 120 and the flange 110. In an exemplary embodiment, the threadless portion 124 has a length of 0 to 1.14 mm.

An end of the second thread 108 that is opposite to the angled portion 122 can include a feature 126 to prevent cross threading. This feature 126 can be a thread design that prevents cross threading of a fastener 200 (discussed below) when the fastener 200 is threaded onto the second thread 108 of the attachment device. An exemplary embodiment of such a cross threading prevention feature 126 is the MAThread® available from MAThread of Wixom, Mich.

The second end 106 of the attachment device 100 also includes a threadless portion 128 positioned between the second thread 108 and an end of the second end 106 onto which the fastener 200 is loaded. This threadless portion 128 guides the fastener 200 to the second thread 108 and also prevents cross threading of the fastener. In an exemplary embodiment length of the threadless portion 128 is from 0 to 1.14 mm.

The end of the second end 106 of the attachment device 100 onto which the fastener 200 is loaded can be a tapered end 130 to assist in loading of the fastener 200. The tapered end 130 can be continuously tapered or have a radius.

An overall length of the attachment device 100, from the end of the first end 102 that is driven into the lighting module 20B to the opposite end of the second end 106 onto which the fastener 200 is loaded can be sized depending on the amount of adjustment that is required for the specific application. In an exemplary embodiment, the overall length of the attachment device 100 is 40.62 to 42.53 mm.

The attachment device 100 can be made of a metal or a metal alloy, such as carbon steel. The attachment device 100 can include a finish, such as zinc plating, and/or a sealant to help prevent rust.

An exemplary embodiment of assembly and adjustment of the top attachment 40 will now be described. Initially, the adjustment device 100 is aligned with a desired mounting location on the lighting module 20B. A hex socket is then fed over the second end 106 and onto the driving feature 120. An end of the hex socket contacts the flange 110 to press the end of the first end 102 against the lighting module 20B. The hex socket provides a rotation force to the adjustment device via contact with the driving feature. The first thread 104 is thus driven into the lighting module 20B. In an exemplary embodiment, the lighting module 20B can include a screw boss and/or the first thread 104 can be thread-forming. The hex socket rotates the adjustment device 100 via the driving feature 120 such that the first thread 104 is driven into the lighting module 20B until the first face 112 of the flange 110 contacts the lighting module 20B. At this point, the adjustment device 100 is fully driven into the lighting module 20B and the serrations 118 lock the adjustment device 100 to the lighting module 20B and help prevent the adjustment device 100 from backing out of the lighting module 20B.

Next, an elastic element 300, such as a spring, is placed on the second end 106 of the attachment device 100 such that a first end 302 of the elastic element 300 abuts the second face 114 of the flange 110. In an exemplary embodiment, the spring has an overall length of 15 mm, a thickness of 1.4 mm, and a spring rate of 42.55 N.mm. The exemplary spring can have an interior diameter of 5.6 to 5.9 mm, an exterior diameter of 8.5 mm and 4.5 total coils with 2.5 of these being useful coils. The spring can be a high carbon steel, such as ASTM A228 and can include a protective coating such as a zinc coating.

The second end 106 of the attachment device 100 is then inserted into a corresponding opening 32 on the bracket 30 such that a second end 304 of the elastic element 300 abuts the bracket 30. Thus, the elastic element 300 is positioned between the lighting module 20B and the bracket 30.

The fastener 200 is then fed onto the second end 106 of the attachment device 100 via the tapered end 130, over the threadless portion 128, and threaded onto the second thread 108 by turning the fastener 200 in a predetermined direction until the fastener 200 contacts the bracket 30. Once the fastener 200 is in contact with a face of the bracket 30, the second end 304 of the elastic element 300 is in contact with the opposite face of the bracket 30, and the first end 302 of the elastic element 300 is in contact with the flange 110, the adjustment device 100 is ready for micro adjustment of the lighting module 20B relative to the bracket 30. Specifically, further turning of the fastener 200 in the predetermined direction on the second thread 108 will move the adjustment device 100 and the lighting module 20B from left to right in FIG. 2, thereby pulling the lighting module 20B towards the bracket 30 and compressing the elastic element 300. The elastic element 300 provides a separating force in a direction opposite to the force applied by turning the fastener 200 in the predetermined direction, thereby biasing the lighting module 20B away from the bracket 30 to maintain precision in the micro adjustment. In an exemplary embodiment in which rotating the fastener in a clockwise direction draws the lighting module 20B toward the bracket 30, a counter-clockwise rotation will allow the elastic element 300 to push the lighting module 20B away from the bracket 30.

In an exemplary embodiment, one full rotation (360 degrees) of the fastener 200 will move the lighting module 20B by 0.5 mm, resulting in 0.6° of rotation relative to the bracket 30. Thus, the attachment device 100 is a single piece that provides micro adjustment of the lighting module 20B relative to the bracket 30, in a precise and accurate manner The fastener 200 can be a nut that can be threaded onto the second thread 106. In an exemplary embodiment, the nut can be an M3-0.5 DIN 985 insert lock nut.

Figure 6:
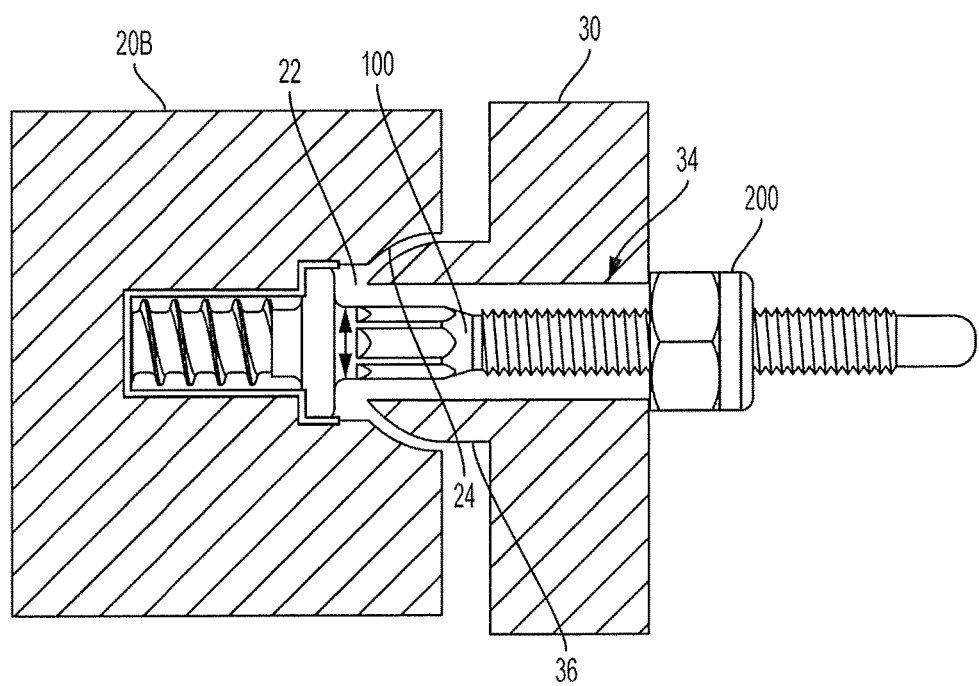
FIG. 6 shows an exemplary bottom attachment.

The attachment device 100 can also be used in the bottom attachment 50, which is a non-adjustable attachment in the exemplary embodiment shown in FIG. 6. To attach the lighting module 20B to the bracket 30 in the bottom attachment 50, the first end 102 of the attachment device 100 is inserted into bore hole 22 in the lighting module 20B and then driven into lighting module 20B in the manner discussed above regarding the top attachment 40. The attachment device 100 is then fed though a corresponding opening 34 of the bracket 30 and a fastener 200 is tightened on the second end 106 of the attachment device 100. The fastener 200 is tightened until the bracket 30 abuts the lighting module 20B. At this point, the lighting module 20B is fixed to the bracket 30 in a non-adjustable manner.

In an exemplary embodiment, the lighting module 20B includes a concave opening 24 and the bracket 30 includes a corresponding convex protrusion 36 such that, as the fastener 200 is tightened to pull the lighting module 20B toward the bracket 30, the convex protrusion 36 enters into the concave opening 24 to help ensure that the lighting module 20B is fixed to the bracket 30 while allowing the lighting module 20B to pivot around the convext protrusion 36 at the concave opening 24 when the lighting module 20B is adjusted at the top attachment 40.

With the lighting module 20B fixed to the bracket 30 in a non-adjustable manner at the bottom attachment 50 and the lighting module 20B fixed to the bracket 30 in an adjustable manner at the top attachment 40, the adjusting at the top attachment 50 will cause a beam of light emitted from the lighting module 20B to move up or down, thereby providing vertical adjustment of the lighting module 20B.

In an alternative embodiment, the lighting module 20B is fixed to the bracket 30 in a non-adjustable manner at the bottom attachment 50 with a press-fit screw or other means of fixation instead of the attachment device 100.

Obviously, numerous modifications and variations of the present invention are possible in light of the above teachings. It is therefore to be understood that within the scope of the appended claims, the invention may be practiced otherwise than as specifically described herein.

The invention claimed is:

1. A device for micro-adjustment of a lighting module, comprising:
    a first end including a thread extending along a longitudinal axis of the device in a helix shape and configured to be driven into a surface of the lighting module;
    a second end including a micro-adjustment thread extending along the longitudinal axis of the device in a helix shape for attachment of a nut to be engaged with the micro-adjustment thread and translated along the longitudinal axis by rotation of the nut;
    a flange positioned between the thread of the first end and the micro-adjustment adjustment thread of the second end; and
    a driving feature positioned between the flange and the micro-adjustment adjustment thread, the driving feature having an outer diameter that is smaller than an outer diameter of the flange.

2. The device according to claim 1, wherein the flange includes a face facing the first end and a plurality of serrations are arranged on the face.

3. The device according to claim 2, wherein the plurality of serrations includes sixteen serrations evenly spaced around the face.

4. The device according to claim 1, wherein the thread of the first end includes a plastic thread or a metal thread to be driven into the surface of the lighting module.

5. The device according to claim 1, wherein the driving feature includes at least six planar surfaces.

6. The device according to claim 1, wherein the outer diameter of the driving feature is larger than the outer diameter of the micro-adjustment adjustment thread.

7. The device according to claim 1, wherein the micro-adjustment adjustment thread has a pitch of 0.1 mm to 4.0 mm.

8. The device according to claim 1, wherein a first end of the micro-adjustment adjustment thread includes a feature configured to prevent cross threading.

9. The device according to claim 1, wherein the second end includes a threadless portion between the micro-adjustment adjustment thread and an end of the second end.

10. The device according to claim 9, wherein the end of the second end is tapered.

11. The device according to claim 1, wherein the outer diameter of the flange is from 7.9 to 8.65 mm.

12. The device according to claim 1, wherein a length of the driving feature is 13.8 to 17.2% of a total length of the device.

13. A lighting apparatus, comprising:
    a lighting module configured to output light from the lighting apparatus;
    a housing;
    a device to attach the lighting module to the housing, the device comprising:
        a first end including a thread driven connected to the lighting module,
        a second end including a micro-adjustment adjustment thread for micro-adjustment adjustment of the lighting module relative to the housing,
        a flange positioned between the thread of the first end and the micro-adjustment adjustment thread of the second end, and
        a driving feature positioned between the flange and the micro-adjustment adjustment thread, the driving feature having an outer diameter that is smaller than an outer diameter of the flange;
    a biasing element, including a first end in contact with the flange and a second end in contact with a first side of the housing, to bias the flange away from the housing; and
    a fastener threaded onto the micro-adjustment adjustment thread such that rotation of the fastener causes the fastener to move along a longitudinal axis of the device, and the fastener is in contact with a second side of the housing.

14. The apparatus according to claim 13, wherein the fastener is a nut threaded onto the micro-adjustment adjustment thread and in contact with the second side of the housing such that rotation of the nut in a first direction decreases a distance between the nut and the flange such that the lighting module is pulled toward the housing and the biasing element is compressed.

15. The apparatus according to claim 14, wherein rotation of the nut in a second direction increases the distance between the nut and the flange such that the biasing element expands and the lighting module is pushed away from the housing.

16. The apparatus according to claim 13, wherein a ratio of the outer diameter of the flange is from 7.9 to 8.65 mm.

17. The apparatus according to claim 13, wherein a length of the driving feature is 13.8 to 17.2% of a total length of the device.

18. The apparatus according to claim 13, further comprising:
    a second device to attach the lighting module to the housing.

19. The apparatus according to claim 13, wherein the second device is non-adjustable.

20. The apparatus according to claim 13, wherein the lighting module is one of a plurality of lighting modules included in the lighting apparatus.

* * * * *